US005948038A

United States Patent [19]

Daly et al.

[11] Patent Number: 5,948,038

[45] Date of Patent: Sep. 7, 1999

[54] TRAFFIC VIOLATION PROCESSING SYSTEM

[75] Inventors: James P. Daly, Victoria, Canada; Clint A. Davis, Bellaire, Tex.; James D. Tuton, Scottsdale, Ariz.

[73] Assignee: American Traffic Systems, Inc., Scottsdale, Ariz.

[21] Appl. No.: 08/688,832

[22] Filed: Jul. 31, 1996

[51] Int. Cl.[6] .............................. G06F 19/00; G06G 7/70; G06G 7/76

[52] U.S. Cl. ............................ 701/117; 342/66; 340/936; 340/937; 340/933; 701/119

[58] Field of Search .............................. 342/66; 340/936, 340/937, 933; 364/562; 382/278; 701/117, 119; 346/33

[56] References Cited

U.S. PATENT DOCUMENTS

| | | | |
|---|---|---|---|
| 2,015,612 | 9/1935 | Adler | 177/337 |
| 2,129,602 | 9/1938 | Adler | 177/329 |
| 2,355,607 | 8/1944 | Shepherd | 177/337 |
| 2,419,099 | 4/1947 | Wall | 234/29.5 |
| 2,871,088 | 1/1959 | Abell | 346/1 |
| 3,044,043 | 7/1962 | Wendt | 340/32 |
| 3,060,434 | 10/1962 | Biedermann et al. | 346/107 |
| 3,088,388 | 5/1963 | Tredopp | 95/31 |
| 3,122,740 | 2/1964 | Kruse | 343/8 |
| 3,148,015 | 9/1964 | Weaver | 346/107 |

(List continued on next page.)

FOREIGN PATENT DOCUMENTS

| | | | |
|---|---|---|---|
| 1290428 | 10/1991 | Canada | G08G 1/54 |
| 1316583 | 4/1993 | Canada | G08G 1/54 |
| 1334031 | 1/1995 | Canada | G08G 1/54 |
| 067905A1 | 12/1982 | European Pat. Off. | G08G 1/10 |
| 188694A2 | 7/1986 | European Pat. Off. | G08G 1/10 |
| 0513628A2 | 11/1992 | European Pat. Off. | G08G 1/052 |
| 2208154 | 11/1973 | France | G08G 1/10 |
| 2201510 | 4/1974 | France | G08G 1/100 |
| 2549263 | 1/1985 | France | G08G 1/09 |
| 2549625 | 1/1985 | France | G08G 1/015 |

(List continued on next page.)

OTHER PUBLICATIONS

Patent Abstracts of Japan, vol. 096, No. 004, Apr. 30, 1996 & JP07336668A (Kubota Corp), Dec. 22, 1995.
Kazuyoshi Asada et al: "Hitachi–IP/200 High–Performance Image Processor" Hitachi Review, vol. 38, No. 4, Aug. 1, 1989, pp. 195–204, XP000071852.
PCT International Search Report; International Application No. PCT/US 97/13581, Mar. 25, 1998.
Michael Lamm, "Smile! You Just Got A Ticket," Popular Mechanics Dec., 1969, pp. 73–76.
Philips Intersection Controller Type 86 Ad/82, Philips Telecommunication Review, vol. 33, No. 1, Mar. 1975.
John Gosch, "Europe Gets 'Thinking' Traffic Lights," Electronics, May 1, 1975, pp. 70–71.

(List continued on next page.)

*Primary Examiner*—William A. Cuchlinski, Jr.
*Assistant Examiner*—Tim Wyckoff
*Attorney, Agent, or Firm*—Tobor & Goldstein, L.L.P.

[57] ABSTRACT

A traffic violation processing method is disclosed, which includes the steps of monitoring a vehicle; determining whether the vehicle is in violation of a traffic violation and recording the image of the vehicle on a camera when the vehicle is determined to have violated a traffic violation; providing a digital image of the vehicle; recording and storing deployment data corresponding to the violation, wherein the deployment data includes an identifier associated with the traffic violation; assigning the identifier to the digital traffic image; storing the digital image of the vehicle, together with the identifier, on a storage medium; matching the deployment data with the stored digital image by correlating or matching the identifier associated with the deployment data with the identifier associated with the stored digital image; and generating a traffic document that includes the stored digital image and the deployment data.

1 Claim, 4 Drawing Sheets

U.S. PATENT DOCUMENTS

| | | | |
|---|---|---|---|
| 3,165,373 | 1/1965 | Scott | 346/107 |
| 3,182,288 | 5/1965 | Smith | 340/0.34 |
| 3,195,126 | 7/1965 | Barker | 343/7 |
| 3,206,748 | 9/1965 | Miller | 343/8 |
| 3,243,806 | 3/1966 | Handschin | 343/8 |
| 3,382,785 | 5/1968 | Melhart | 95/53 |
| 3,438,031 | 4/1969 | Fathauer | 343/8 |
| 3,522,611 | 8/1970 | Maronde | 346/107 |
| 3,554,102 | 1/1971 | Maronde | 95/1.1 |
| 3,573,724 | 4/1971 | Komorida | 340/38 |
| 3,579,236 | 5/1971 | Piechocki | 343/8 |
| 3,581,647 | 6/1971 | Maronde | 95/53 E |
| 3,603,227 | 9/1971 | Maronde et al. | 95/1.1 |
| 3,604,330 | 9/1971 | Baierbrunn et al. | 95/53 |
| 3,618,084 | 11/1971 | Balsiger | 343/7 A |
| 3,626,413 | 12/1971 | Zachmann | 343/8 |
| 3,680,043 | 7/1972 | Angeloni | 340/33 |
| 3,696,369 | 10/1972 | Laymon et al. | 340/258 |
| 3,699,583 | 10/1972 | Beguin | 343/756 |
| 3,754,253 | 8/1973 | Balsiger | 343/7 ED |
| 3,795,002 | 2/1974 | Nemit | 343/754 |
| 3,798,655 | 3/1974 | Meek et al. | 343/756 |
| 3,816,841 | 6/1974 | Maronde et al. | 95/10 CD |
| 3,833,762 | 9/1974 | Gudmundsen | 178/7.1 |
| 3,833,906 | 9/1974 | Augustine | 343/784 |
| 3,833,909 | 9/1974 | Schaufelberger | 343/754 |
| 3,849,784 | 11/1974 | Holzapfel | 346/107 VP |
| 3,858,223 | 12/1974 | Holzapfel | 346/107 VP |
| 3,859,660 | 1/1975 | Augustine et al. | 343/8 |
| 3,866,165 | 2/1975 | Maronde et al. | 340/31 C |
| 3,913,085 | 10/1975 | Farstad | 340/261 |
| 3,930,735 | 1/1976 | Kerr | 356/167 |
| 3,952,311 | 4/1976 | Lapeyre | 354/5 |
| 3,982,255 | 9/1976 | Orlando | 354/70 |
| 4,051,499 | 9/1977 | Kondo | 354/234 |
| 4,053,909 | 10/1977 | Shinoda et al. | 354/105 |
| 4,085,434 | 4/1978 | Stevens | 361/413 |
| 4,112,424 | 9/1978 | Lapeyre | 340/336 |
| 4,152,729 | 5/1979 | Hobbs et al. | 358/222 |
| 4,157,218 | 6/1979 | Gordon et al. | 354/66 |
| 4,168,894 | 9/1979 | Adolph | 354/105 |
| 4,173,010 | 10/1979 | Hoffmann | 340/31 C |
| 4,192,595 | 3/1980 | Wakazono et al. | 354/133 |
| 4,200,871 | 4/1980 | Roeder et al. | 343/7.4 |
| 4,229,726 | 10/1980 | Deaton et al. | 340/38 R |
| 4,236,140 | 11/1980 | Aker et al. | 343/8 |
| 4,245,254 | 1/1981 | Svensson et al. | 358/222 |
| 4,257,029 | 3/1981 | Stevens | 340/40 |
| 4,258,430 | 3/1981 | Tyburski | 364/900 |
| 4,303,945 | 12/1981 | Fawcett et al. | 358/222 |
| 4,322,828 | 3/1982 | Hoff et al. | 367/118 |
| 4,335,383 | 6/1982 | Berry | 343/8 |
| 4,337,528 | 6/1982 | Clinard et al. | 367/136 |
| 4,344,685 | 8/1982 | Milatz et al. | 354/173 |
| 4,353,632 | 10/1982 | Saito et al. | 354/133 |
| 4,362,373 | 12/1982 | Kazami et al. | 354/234 |
| 4,386,862 | 6/1983 | Kittel et al. | 400/144.2 |
| 4,408,533 | 10/1983 | Owen et al. | 102/211 |
| 4,408,857 | 10/1983 | Frank | 354/234 |
| 4,444,479 | 4/1984 | Johnson et al. | 354/413 |
| 4,479,704 | 10/1984 | Masunaga | 354/137 |
| 4,500,868 | 2/1985 | Tokitsu et al. | 340/52 F |
| 4,505,559 | 3/1985 | Prinz | 354/66 |
| 4,527,877 | 7/1985 | Kurosu et al. | 354/234.1 |
| 4,527,894 | 7/1985 | Goede et al. | 356/28 |
| 4,591,823 | 5/1986 | Horvat | 340/53 |
| 4,600,283 | 7/1986 | Görsch et al. | 354/66 |
| 4,616,911 | 10/1986 | Zeth et al. | 354/66 |
| 4,634,254 | 1/1987 | Ogihara et al. | 354/403 |
| 4,644,368 | 2/1987 | Mutz | 346/33 |
| 4,645,343 | 2/1987 | Stockdale et al. | 356/326 |
| 4,654,876 | 3/1987 | Atkins | 382/54 |
| 4,660,050 | 4/1987 | Phillips | 343/753 |
| 4,661,849 | 4/1987 | Hinman | 358/136 |
| 4,664,494 | 5/1987 | Hughes et al. | 354/234.1 |
| 4,707,735 | 11/1987 | Busby | 358/108 |
| 4,717,915 | 1/1988 | Goede | 342/66 |
| 4,743,971 | 5/1988 | Hügli | 358/213.26 |
| 4,747,155 | 5/1988 | Dotson | 382/42 |
| 4,761,666 | 8/1988 | Goto | 354/133 |
| 4,764,781 | 8/1988 | Leib et al. | 354/65 |
| 4,788,553 | 11/1988 | Phillips | 343/786 |
| 4,789,904 | 12/1988 | Peterson | 358/310 |
| 4,796,090 | 1/1989 | Fraier | 358/0.211 |
| 4,796,109 | 1/1989 | Sordello et al. | 360/45 |
| 4,799,112 | 1/1989 | Bremmer et al. | 360/31 |
| 4,803,710 | 2/1989 | Elabd | 377/60 |
| 4,809,030 | 2/1989 | Takagi et al. | 354/414 |
| 4,814,629 | 3/1989 | Arnold | 250/578 |
| 4,847,772 | 7/1989 | Michalopoulos et al. | 701/117 |
| 4,866,438 | 9/1989 | Knisch | 340/936 |
| 4,884,072 | 11/1989 | Horsch | 340/937 |
| 4,887,080 | 12/1989 | Gross | 340/937 |
| 4,890,129 | 12/1989 | Mody | 354/234.1 |
| 4,908,705 | 3/1990 | Wright | 358/109 |
| 4,922,339 | 5/1990 | Stout et al. | 358/108 |
| 4,942,415 | 7/1990 | Felle et al. | 354/234.1 |
| 4,949,186 | 8/1990 | Peterson | 358/335 |
| 4,952,809 | 8/1990 | McEwen | 250/342 |
| 4,973,996 | 11/1990 | Harvey | 354/106 |
| 4,973,997 | 11/1990 | Harvey | 354/105 |
| 4,984,003 | 1/1991 | Matsumoto et al. | 354/235.1 |
| 4,988,994 | 1/1991 | Loeven | 340/936 |
| 4,996,546 | 2/1991 | Pagano et al. | 354/76 |
| 5,005,042 | 4/1991 | Sato et al. | 354/412 |
| 5,041,828 | 8/1991 | Loeven | 340/937 |
| 5,066,950 | 11/1991 | Schweitzer et al. | 340/937 |
| 5,082,365 | 1/1992 | Kuzmick et al. | 356/28 |
| 5,093,682 | 3/1992 | Hicks | 355/1 |
| 5,107,250 | 4/1992 | Pykett | 340/566 |
| 5,128,702 | 7/1992 | Ogawa et al. | 354/106 |
| 5,155,597 | 10/1992 | Lareau et al. | 358/213.24 |
| 5,177,691 | 1/1993 | Welles et al. | 364/485 |
| 5,202,692 | 4/1993 | Huguenin et al. | 342/179 |
| 5,204,675 | 4/1993 | Sekine | 340/933 |
| 5,218,397 | 6/1993 | Takagi | 354/415 |
| 5,221,956 | 6/1993 | Patterson et al. | 356/28 |
| 5,224,075 | 6/1993 | Iino et al. | 367/91 |
| 5,231,393 | 7/1993 | Strickland | 340/936 |
| 5,239,296 | 8/1993 | Jenkins | 340/936 |
| 5,239,336 | 8/1993 | Matsui et al. | 354/416 |
| 5,250,946 | 10/1993 | Stanczyk | 340/936 |
| 5,257,056 | 10/1993 | Kazumi | 354/234.1 |
| 5,264,896 | 11/1993 | Lee et al. | 354/234 |
| 5,291,237 | 3/1994 | Tagami et al. | 354/413 |
| 5,315,306 | 5/1994 | Doughty et al. | 342/192 |
| 5,325,142 | 6/1994 | Depatie et al. | 354/234.1 |
| 5,345,243 | 9/1994 | Levis | 342/173 |
| 5,381,155 | 1/1995 | Gerber | 342/104 |
| 5,389,989 | 2/1995 | Hawkins et al. | 354/106 |
| 5,432,547 | 7/1995 | Toyama | 348/149 |
| 5,515,042 | 5/1996 | Nelson | 340/937 |
| 5,525,996 | 6/1996 | Aker et al. | 342/104 |
| 5,528,245 | 6/1996 | Aker et al. | 342/104 |
| 5,568,406 | 10/1996 | Gerber | 364/562 |
| 5,651,075 | 7/1997 | Frazier et al. | 382/278 |
| B1 3,952,311 | 3/1990 | Lapeyre | 354/5 |

FOREIGN PATENT DOCUMENTS

| | | | |
|---|---|---|---|
| 2365331 | of 0000 | Germany . | |
| 683658 | 11/1939 | Germany . | |
| 1078797 | 3/1960 | Germany | G07C 42/20 |

| | | | |
|---|---|---|---|
| 225077 | 5/1962 | Germany . | |
| 1172066 | 6/1964 | Germany . | |
| 1597378 | 4/1970 | Germany . | |
| 1574126 | 10/1971 | Germany | G08G 1/10 |
| 2129984 | 2/1972 | Germany | G08G 1/10 |
| 2211462B2 | 3/1973 | Germany | G08G 1/10 |
| 2307217 | 12/1974 | Germany | G08G 1/10 |
| 2356909A1 | 5/1975 | Germany | G08G 1/10 |
| 2365331 | 2/1976 | Germany | G08G 1/10 |
| 2802448C2 | 7/1979 | Germany | G03B 15/05 |
| 2817846A1 | 10/1979 | Germany | G03B 11/28 |
| 3034161A1 | 4/1982 | Germany | G03B 17/24 |
| 3220434A1 | 12/1983 | Germany | G01D 1/18 |
| 3306040A1 | 8/1984 | Germany | G01S 13/91 |
| 3327706A1 | 2/1985 | Germany | G08G 1/10 |
| 3422764A1 | 1/1986 | Germany | H04N 5/76 |
| 3535588A1 | 4/1987 | Germany | G03B 15/00 |
| 4214595 | 11/1993 | Germany | G01P 21/100 |
| 4446642 | 6/1996 | Germany . | |
| 6-243387 | of 0000 | Japan . | |
| 49-13730 | 6/1974 | Japan . | |
| 414210 | 12/1966 | Sweden . | |
| 470674 | 5/1969 | Switzerland | G01S 9/44 |
| 945693 | 1/1964 | United Kingdom . | |
| 1480981 | 7/1977 | United Kingdom | G03B 1/22 |
| 1494945 | 12/1977 | United Kingdom | G06M 3/06 |
| 2256072 | 11/1992 | United Kingdom . | |
| WO86/01615 | 3/1986 | WIPO | G03B 17/24 |
| WO94/28527 | 5/1994 | WIPO . | |
| WO9716806 | 5/1997 | WIPO . | |

OTHER PUBLICATIONS

"ORBIS III—A New Concept in Traffic Surveillance," LTV Aerospace Corporation, Dallas, Texas 1975.

"Mobile Orbis III Speed Enforcement Demonstration Project in Arlington, Texas," Final Report, vol. I–Program Evaluation, National Highway Traffic Safety Administration, Department of Transportation, Contract No. DOT–HS–346–3–692, Jun. 30, 1976.

John Hewer, "High Technology Instrument Foils Hasty,"—*Canadian Electronics Engineering*, Aug. 1979, pp. 28–31.

"Multafot—Fully Automatic Red Light Surveillance System," Zellweger Uster Ltd., Uster, Switzerland, 1979.

Glanz et al., "Technology for use in 'Automated' Speed Enforcement," DOT HS–805 545, Midwest Research Institute, Kansas City, Missouri, Interim Report, Jun. 1980.

Werner Kullik, Traffipax–Microspeed–Ein neues, supermodernes Radargerät für die Geschwindigkeitsüberwachung—(Traffipax–Microspeed—a new highly modern radar apparatus for speed monitoring), Polizei, Verker und Technik: Fachzeitschrift für Verkehrs–und Polizeitechnik, Jan. 1982, pp. 49–53.

"Philosophy of application and benefit of the radar speed meters manufactured by Zellweger Uster Ltd.," Zellweger Uster, Ltd., Uster, Switzerland (Apr. 1983).

Blackburn et al., "Pilot Tests of Automated Speed Enforcement Devices and Procedures," DOT HS–806 573, Midwest Research Institute, Kansas City, Missouri, Final Report, Feb. 1984.

"Zellweger USTER Traffic Electronics Multanova®—Radar 6F Photo–exposure type–radar equipment with integrated allocation of measured value," Brochure No. E/10.85/2500, Zellweger Uster Ltd., Uster, Switzerland, 1984.

Dr. Ulrich Löhle, "Genauigkeit polizeilicher Verkehrsüberwachungs–methoden (Accuracy of traffic monitoring methods by the police)," Deutsches Autorecht: Rechtszeitschrift des Allgemeinen Deutschen Automobil Clubs, Dec. 1984, pp. 394–409.

Claus–H. Lührs, "Geschwindigkeitmessung im Strassenverkehr," Forschungsbericht MA–3, Vorträge des 65. PTB–Seminars, Braunschweig, Feb., 1986. (Talks given during the 65th PTB seminar on traffic speed measurements, edited by Claus–H. Lyhrs, Federal Institute for the Standardization of Physical Measures).

Dickerson, "Speeders Will Get Photo Finish," The Friendswood Weekend Journal, May 30, 1986.

"New Device to Trap Speeders," Dun's Business Month, Jun. 1986.

"LM Man Sells Photo–Radar," The LaMarque Times, Jul. 9, 1986.

"La Marque Utilizing Photographic Radar to Catch Speeders," Houston Chronicle, No star edition, Section 1, p. 25, Oct. 24, 1986.

Mark Toohe, "Pioneering Photo Radar/Area Police Try New Technology to Nab Speeders," Houston Chronicle, 2 Star Edition, Business Section, p. 2, Nov. 16, 1986.

"Traffipax—Radar Measurement in Moving Traffic—Traffipax unit type VM with digital Tachometer and micro speed 09," Traffipax–Vertrieb, Düsseldorf, Germany, Sep. 1987.

"Traffic Electronics—Multafot–Front—Fully–automatic red Light Surveillance System with Frontal Photographs," Zellweger Uster AG, Uster, Switzerland, 1987.

"Truvelo M4$^2$ Speed Measuring Device," Brochure, Apr. 15, 1988.

"Truvelo Traffic Law Enforcement Camera System," Brochure, Apr. 16, 1988.

Pigman et al., "Evaluation of Unmanned Radar Installations," 14th International Forum on Traffic Records Systems, Jul. 1988.

Freedman, et al., "Public Opinion Regarding Photo Radar," *Insurance Institute for Highway Safety*, Arlington, VA 1989.

"Film analyzing simplified—Multascope," Multanova Brochure No. 007 2/492/500, Zellweger Uster Ltd., Uster, Switzerland, 1989.

"Multascope," Multanova AG Brochure No. 23 5a 007–2112.89_/ 1500, Zellweger Uster Ltd., Uster, Switzerland, 1989.

"Multacard System—Your 6F–radar measurements at a glance," Multanova AG Brochure No. 23 50 006–2/9 89/2000, Zellweger Uster Ltd., Uster, Switzerland, 1989.

"Multanova® Fully Automatic Radar Equipment 6FA," Multanova AG Brochure No. 23 50009/11 91/1000, Zellweger Uster Ltd., Uster, Switzerland, 1989.

"Traffipax—Traffiphot—The Photographic Red–Light Monitor," Le Marquis Audio International, Inc., Garden City, New York, Mar. 1989.

"Data Recording Magazine with the DE–32 Module for Data Recording DM–100/200," Victor Hasselblad Inc., Fairfiled, N.J., Sep., 1989.

Blackburn et al., "Update of Enforcement Technology and Speed Measurement Devices," DOT HS 807584 Final Report, National Highway Traffic Safety Administration, U.S. Department of Transportation, Dec., 1989.

"PhotoCop™ Accident Reduction Program," Brochure, Traffic Monitoring Technologies, Friendswood, Texas 1990.

"PhotoCop™ Speed Control Accident Reduction Program," Brochure, Traffic Monitoring Technologies, Friendswood, Texas 1990.

"Photoradar—Automated Speed Enforcement," U.S. Public Technologies, Inc., Los Angeles, CA 1990.

"Traffipax Memory Card System," Traffipax–Vertrieb, Düsseldorf, Germany, Sep. 1990.

"Traffiscan—The Video System for Efficient Exploitation of Films" Traffipax–Vertrieb, Düsseldorf, Germany, Sep. 1990.
"Click! GTEL SPIE System Gives You the Numbers You Need," Brochure, GTEL Corporation, Wilmington, Delaware, 1991.
"Multistat—Stationary speed measuring System," Multanova AG, Uster, Switzerland, 1991.
"Traffipax Speedophot—Traffic Radar Unit with Automatic Recording," Traffipax–Vertrieb, Düsseldorf, Germany, Mar. 1991.
"Multanova—Moving Radar MR–6F," Multanova AG, Uster, Switzerland, Apr. 1991.
"PhotoCop® Speed Control Accident Reduction Program," pepared by Traffic Monitoring Technologies for West Valley City, Utah, Photo–Radar Review Committee, Apr. 1991.
"Traffipax—The Company," Traffipax–Vertrieb GMBH, Düsseldorf, Germany, Jul. 19, 1991.
Insurance Institute for Highway Safety Status Report, vol. 26, No. 8, Insurance Institute for Highway Safety, Arlington, Virginia, Sep. 14, 1991.
"Traffipax—Traffiphot–S, Stationary Speed Measuring Unit with Automatic Photo Recording" Traffipax–Vertrieb GMBH, Düsseldorf, Germany, Nov. 11, 1991.
"Multascope—Film analysing simplified," Multanova AG, Uster, Switzerland, 1992.
"Multagraph VT11—Traffic Monitoring with Video," Multanova AG, Uster, Switzerland, 1992.
Community Accident Reduction Effort Photo–Radar West Valley Police Brochure, West Valley City, Utah, 1992.
"Traffipax Traffic Surveillance Systems," Traffipax–Vertrieb, Brochure No. PMP 4.621, Dusseldorf, Germany Apr. 1992.
"Multanova 6FA Automatic–Radar installed on the motorway BAB9 'Nürnberg—München'" Multanova AG, Uster, Switzerland, Apr. 8, 1992.
"Multanova Speed measurement and red light control together in ONE unit," Multanova AG, Uster, Switzerland, Apr. 8, 1992.
"Automated Crash Reduction Systems—Overview—Services and Products," American Traffic Systems, Scottsdale, Arizona Nov. 1992.
"New Zealand Police Request for Tender 92/93/405 Vehicle Surveillance Equipment and Systems," American Traffic Systems, Scottsdale, Arizona (Jun. 17, 1993).
"Auto Patrol System," American Traffic Systems, Scottsdale, Arizona, submitted to Oxnard Police Department, Oxnard, California on Dec. 28, 1993.
"New Zealand Police Request for Tender 93/94/188 Static Vehicle Surveillance Equipment," American Traffic Systems, Scottsdale, Arizona, (Feb. 4, 1994).
"Gatso Radar, Type 24," Gatsometer B.V., Overveen, Netherlands.
"Golden River Speed Enforcement System," Golden River Traffic Limited, Oxfordshire, England.
"Multacard System," Zellweger Uster Ltd., Uster, Switzerland.
"Multanova® Fully Automatic Radar Equipment 6FA," Zellweger Uster Ltd., Uster, Switzerland.
"Multanova® Road Safety System," Zellweger Uster Ltd., Uster, Switzerland.
"Photo–Radar Automated Crash Reduction System," American Traffic Systems, Scottsdale, Arizona.
The PhotoCop Photo–Radar System, Traffic Monitoring Technologies, Friendswood, Texas 77546, Jan. 1990.
"Photo–Cop Photo–Radar Instruction Manual," Traffic Monitoring Technologies, Friendswood, Texas 77546, Jan. 2, 1990.
"Traffipax—Traffiphot—The Photographic Red–Light Monitor," Le Marquis Audio International, Inc., Garden City, New York.
"Traffipax—Traffic Radar Unit—Le Marquis–Micro Speed," Le Marquis Audio International, Inc., Garden City, New York.
"Vehicle Speed Radar," AWA Defence Industries Pty. Ltd., Adelaide, South Australia.
"Radar Control RC 110," Trafikanalys AB, Gävle, Sweden, (Brochure with radar unit on cover).
"Radar Control RC 110," Trafikanalys AB, Gävle, Sweden, (Brochure with roadway on cover).
"Automatic Radar Control ARC 110, "Trafikanalys AB, Gävle, Sweden.
"Autopatrol™ Photo–Radar Speed Enforcement," Brochure, American Traffic Systems, Scottsdale, Arizona.
Abstract collection, including abstracts of eleven German language articles (with English translations of the abstracts) and abstracts of twelve English–language articles.
"Camera Gets Black and White Evidence Against Speeding Motorist," Machine Design, Band 38, Nv. 2, Jan. 1966.
"Making Safety Happen," Brochure, American Traffic Systems, Scottsdale, Arizona.
"Automated Photographic Enforcement Systems," Brochure, American Traffic Systems, Scottsdale, Arizonaity, New York.

TRAFFIC VIOLATION PROCESSING SYSTEM

BACKGROUND OF THE INVENTION

1. Field of the Invention

The invention relates broadly to a traffic violation processing system. In one or more specific embodiments, the invention is directed to a method of recording and storing digitized vehicle images and textual information (e.g., alphanumeric data from the license plate of a monitored vehicle) and processing the stored data to provide an integrated evidentiary record for traffic violation enforcement purposes.

2. Description of Related Art

Traffic monitoring systems have been used for a number of years to identify vehicles violating various traffic regulations, ranging from exceeding the speed limit to running red lights or stop signs. Some of these traffic monitoring systems include cameras configured to take a photographic image of the violators. Sometimes, the traffic monitoring systems are located in a monitoring vehicle, e.g., a police car. In other cases, the systems are not located in a vehicle, but rather are stationary, positioned close to the roadway, e.g., on the ground or elevated on a pole. Sometimes, the systems are controlled by an operator who is present during monitoring. The systems may also be operated automatically, without an operator being present. In either case, the images captured by the camera on film are typically stored in a film magazine. The photographic images recorded on film by the camera are often used to form evidentiary records for purposes of proving the existence of a violation.

One of the shortcomings associated with storing images on film is that the number of images that can be stored tends to be limited by the space in the film magazine. The system's ability to record violations is thus limited by the capacity of the film magazine. When the film magazine reaches its maximum capacity, the system can no longer record images of violators. Because it is often difficult if not impossible to accurately estimate the number of violators at a given location, it is also difficult to determine when the capacity of the film magazine has been reached.

Another shortcoming of these earlier systems is that the operator must often make frequent trips to a central processing location to deliver the film for developing and processing. The need to make such frequent trips can occupy a great deal of time. The expenditure of time is magnified when numerous traffic monitoring systems are located in different geographic locations at inconvenient distances from central processing location.

Yet another shortcoming of the earlier systems is the labor-intensive process of matching the vehicle in each photographic image with registered owner information, in order to prepare traffic citations or an evidentiary record. For example, after the image is developed, the photograph is examined by a person to identify the license plate number. Next, the license plate number is correlated with a listing of registered vehicle owners to determine the name of the owner, after which the traffic citation is prepared. This is done typically by manually inputting information relating to the traffic violation, then mailing the traffic citation to the registered owner. This cumbersome process is inefficient and results in high costs and expenditures of time. A continuing need therefore exists for a traffic violation processing system that overcomes one or more of the abovementioned shortcomings.

SUMMARY OF INVENTION

In a broad aspect, this invention is directed to a traffic violation processing method, which preferably includes the steps of monitoring a vehicle; determining whether the vehicle is in violation of a traffic violation; recording a digital traffic image comprising the digital image of the vehicle; recording alphanumeric traffic data corresponding to the vehicle; storing the digital traffic image and the alphanumeric traffic data on a storage media; matching the alphanumeric traffic data with registered owner information from a database which identifies the vehicle's registered owner; and providing a traffic document comprising the traffic violation, the identity of the registered owner, and the digital traffic image.

In a preferred embodiment, the method includes the steps of assigning an image control number (ICN) or other identifier to a traffic image frame, wherein the ICN or identifier is associated with a specific traffic violation; transferring a set of deployment data (which includes the ICN or identifier as well as other information regarding the traffic violation) to storage media. Preferably, the deployment data are stored on a portable diskette. The method then involves combining a digitized version of the traffic image with the ICN or identifier; storing the digitized image (together with the ICN or identifier) on a database; matching the deployment data with the stored digital image by correlating or matching the ICN or identifier associated with the deployment data with the ICN or identifier associated with the stored digital image; and generating a traffic document that includes the stored digital image and the deployment data.

Preferably, the method also includes processing the digitized trafffic image by reducing the resolution of the image and extracting an LPA image from the digitized traffic image by removing or clipping a portion of the digitized traffic image to provide the LPA. The method also includes preferably includes the steps of reading a license plate number from the digitized image or the LPA using optical character recognition (OCR); storing the license plate number along with the ICN from the image in a database, preferably the same database on which the traffic image is stored; and matching the license plate number with the stored image and the deployment data using the ICN. Preferably, the license plate number recovered from the image using OCR is matched with the license plate number recovered from a registered vehicle owner database; and a traffic document is generated, containing the digital traffic image, the deployment data, and the license plate number, along with other information regarding the vehicle owner and the nature of the violation.

In yet another specific embodiment, the traffic violation processing method includes the steps of monitoring a vehicle; determining whether the vehicle is in violation of a traffic violation; recording a first digital traffic image comprising the image of the vehicle; compressing the first digital traffic image to reduce the resolution of the first digital traffic image and provide a low resolution traffic image; storing the low resolution traffic image in a storage media; extracting a portion of the first digital traffic image containing the license plate of the vehicle to provide a second digital traffic image comprising an image of the license plate having alphanumeric traffic data; storing the second digital traffic image in a storage media; reading the alphanumeric traffic data from the second digital traffic image; storing the alphanumeric traffic data in a storage media in the form of an ASCII text string; comparing the stored alphanumeric traffic data from the second digital traffic image with registered vehicle owner information stored in a database to identify the registered owner of the vehicle; and generating a traffic document comprising the second digital traffic image, the name of the registered owner and the nature of the traffic violation.

DETAILED DESCRIPTION AND SPECIFIC EMBODIMENTS

Figure 1:
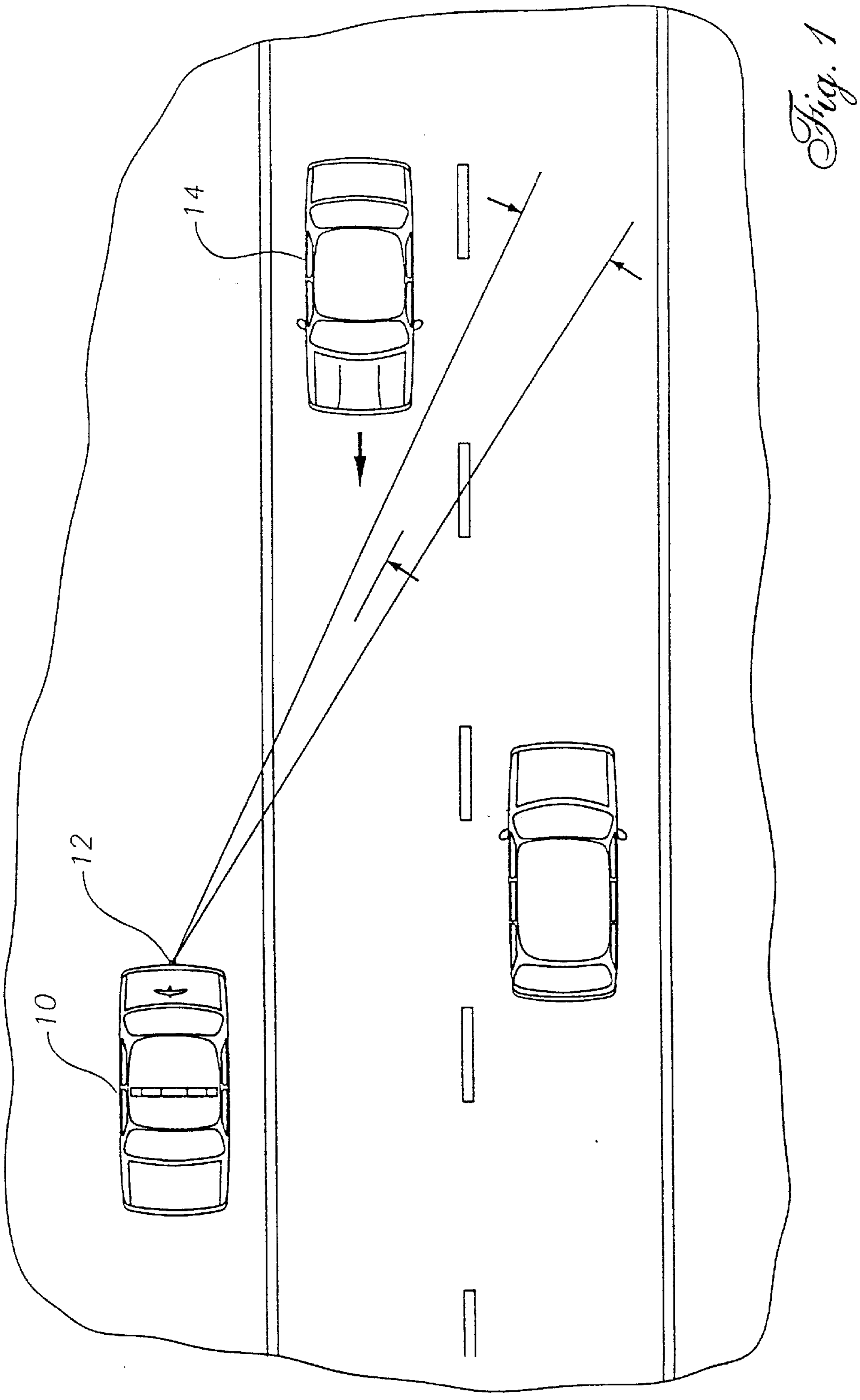
FIG. 1 is on overhead view of a traffic monitoring system positioned in a monitoring vehicle next to a roadway.

The invention relates broadly to a traffic violation processing system. In one or more specific embodiments, the invention is directed to a method of recording and storing digitized vehicle images and textual information (e.g., alphanumeric data from the license plate of a monitored vehicle) and processing the stored images and data to provide an evidentiary record for traffic violation enforcement purposes.

The steps or operations discussed below refer to the storage of the image and text for one image frame. Each frame may be processed in the same manner. The storing of the image and traffic data as described below preferably results in a composite image/textual information "offense record." This offense record preferably includes a compressed low resolution image, e.g., either a compressed license plate only (LPO) image or a compressed license plate area (LPA) image, together with traffic data such as plate owner information, license plate registration and jurisdiction information and camera deployment data. A specific version or embodiment of the invention is referred to by the inventors as the Autoscan™ system, although other versions of the invention are also contemplated. Also, the invention may be utilized with any number of traffic monitoring systems or traffic cameras, and is not directed to any particular one.

One aspect of the invention relates to traffic image processing and storage, specifically, the processing of images containing vehicles being monitored for compliance with traffic regulations. Another aspect of the invention relates to traffic data processing and storage.

(1) Traffic Images

One aspect of the invention involves processing traffic images. The term "traffic image" as used herein refers broadly to any image that includes the image of the vehicle being monitored, including the "traffic scene image," the "vehicle image," the "LPA image" (license plate area image) and/or the "LPO image" (license plate only image). Before processing, the image must be in digital form. Preferably, the digital images are black and white images, i.e., non-color, because the resolution of black and white images is typically higher than the resolution for color images. High resolution images are desirable for purposes of optical character recognition. Any one of the aforementioned traffic images may also be reduced in resolution as discussed in greater detail below to provide a low resolution traffic image or low resolution scene (LRS) image. The various images are exemplified in FIG. 2. The term "traffic scene image" 16 refers to the image of the entire scene captured by the camera. The "vehicle image" 18 is actually a sub-image, i.e., a portion of the traffic scene image that includes the image of the vehicle itself. The "non-vehicle image" 19 is another sub-image, i.e., the portion of the traffic scene image containing the surrounding scenery, such as the roadway, the traffic light, the speed limit sign, etc., but excluding the portion of the image showing the vehicle. The "LPA image" 20 is the sub-image portion of the vehicle image containing the license plate (or license tag). The "LPO image" refers to the sub-image portion of the LPA image consisting solely of the license plate 22, e.g., after the LPA image has been clipped to remove non-license plate imagery. For example, the larger traffic scene image may occupy an array of 3000×2000 pixels, while the vehicle image may occupy a portion of the total traffic scene image (typically less than half and sometimes less than about ¼ to ⅓ of the traffic scene image). The LPA image may occupy a portion of the vehicle image, e.g., having an array of 768×512 pixels. The LPO image may occupy a portion of the LPA image, e.g., having an array of 300×200 pixels.

A variety of devices for capturing traffic images may be used, and the particular device used for image capture is beyond the scope of the invention. For example a traffic image may be recorded on photographic film, e.g., 35 mm film, using a film-based camera, then scanned and digitized, i.e., converted to digital form to provide a digital traffic image. Traffic monitoring systems with cameras are generally well-known. Specific embodiments of traffic monitoring systems that include a film-based camera are disclosed in co-pending applications, Ser. Nos. 08/251,977; 08/252,331; and 08/252,182, which are hereby incorporated by reference to the extent not inconsistent with this invention. Other specific embodiments of traffic monitoring systems that may be used with this invention are described in U.S. Pat. Nos. 4,847,772; 4,866,438; and 4,717,915, each of which is hereby incorporated by reference to the extent not inconsistent with this invention.

Alternatively, a digitized (or digital) traffic image may be recorded directly using a digital camera. Such a digital image could be stored, for example, in a charged-couple device (CCD) digital storage unit. In general, methods for capturing digital images using CCD-based cameras are known, including those disclosed in U.S. Pat. No. 5,182,647, which is incorporated by reference to the extent not inconsistent with this invention.

Photographic images from color or black and white film may be scanned using the scanner, converted from a negative to a positive image if desired, then directed to the image processing system for further treatment. The deployment data, discussed below, may also be placed on the film or on the digitized image. Any commercially available scanner may be utilized for these purposes. Preferably, a high resolution high quality image is formed, e.g, a 3000×2000 pixel, 16-bit colored image. The scanning system preferably includes a Kodak PCD Film Scanner 6000 and SUN Sparc 10 PCD Data Manager S600 (for film digitization). Devices for scanning and/or digitizing images are generally well-known, as disclosed in U.S. Pat. No. 4,847,772, and also in U.S. Pat. No. 5,063,460, which is hereby incorporated by reference to the extent not inconsistent with this invention.

(2) Traffic Data

An important aspect of this invention is the storage and processing of traffic data. The term "traffic data" as used herein refers broadly to any alphanumeric or textual information related to the traffic situation being monitored, including both location information and vehicle information. "Location information" broadly includes information related to the site or location where the vehicle is being monitored, such as the specific address the monitored vehicle was located at the time of image capture, the speed limit at that particular location, the date and time of the image capture and whether an intersection or railroad crossing is involved. "Vehicle information" broadly includes information that is specific to the vehicle whose image is being captured, including information derived from the vehicle image using conventional optical character recognition (OCR), such as the license tag number and jurisdiction (e.g., state indicated on the license tag). "Vehicle information" may also include information derived from the external registration database, e.g., registered owner information, obtained after the LPA image has been processed, as discussed below. The traffic data may be stored on a data diskette in textual form, or on some other conventional data storage means. The traffic data may be stored simultaneously with the capturing of the traffic scene image. Each "violation record" or "offense record" may include both a traffic image and corresponding alphanumeric traffic data, and may be stored as a separate record in the database.

Preferably, one set of traffic data is recovered from the captured image using the OCR step, while another set of traffic data, referred to herein as "deployment data," is recovered from traffic monitoring system. The deployment data includes certain violation information that is recordable by the traffic monitoring system. The deployment data may include, for example, an image contral number (ICN), the measured vehicle speed, applicable speed limits, the date and time of violation, traffic conditions (e.g., rain) and the identity of the operator of the traffic monitoring system. The deployment data are preferably transferred from the traffic monitoring system to a standard 3½" computer diskette, then downloaded or otherwise transferred to the central server.

(3) Matching Traffic Images and Traffic Data

A specific embodiment of the invention is directed to a method of matching traffic images and traffic data to provide an integrated traffic document, which may be used to notify the traffic violator of the violation and may also be used as an evidentiary package. In a specific embodiment, the method includes the step of attaching an identifier to a traffic image, e.g., assigning an image control number (ICN) to a traffic image frame, where the ICN is associated with the traffic violation. The method also includes the steps of transferring a set of deployment data (which includes the identifier to a storage medium, preferably a diskette; storing a digitized version of the traffic image (together with the identifier) on a database; matching the deployment data with the stored digital image by matching the identifier associated with the deployment data with the identifier associated with the stored digital image; and generating a traffic document that includes the stored digital image and the deployment data.

Preferably, the method also includes processing the digitized trafffic image by reducing the resolution of the image and extracting an LPA image from the digitized traffic image by removing or clipping a portion of the digitized traffic image to provide the LPA. The method also includes preferably includes the steps of reading a license plate number from the digitized image or the LPA using optical character recognition (OCR); storing the license plate number along with the ICN from the image in a database, preferably the same database on which the traffic image is stored; and matching the license plate number with the stored image and the deployment data using the ICN. Preferably, the license plate number recovered from the image using OCR is matched with the license plate number recovered from a registered vehicle owner database; and a traffic document is generated, containing the digital traffic image, the deployment data, and the license plate number, along with other information regarding the vehicle owner and the nature of the violation.

(4) Resolution Reduction

In a specific embodiment of the invention, the traffic violation processing method includes the step of resolution reduction, to convert the initial high resolution digital image to a lower resolution image. As used herein, the term "low resolution image" is a relative term which refers to any traffic image after its original resolution has been reduced. Preferably, the resolution of one or more of the digitized images (e.g., the traffic scene image or the vehicle image) is reduced to provide a corresponding low resolution image. Preferably, the LPA image is taken from the original high resolution and stored separately, and any remaining images that are to be stored are reduced in resolution prior to being stored. Advantageously, this resolution reduction step reduces the digital storage requirements for that image.

Such resolution reduction may be accomplished in a number of ways. Resolution reduction is preferably accomplished using digital compression, i.e., by compressing one or more of the digitized images. Standard JPEG methods, developed by the Joint Photographic Experts Group, may be used to accomplish this digital compression. JPEG methods involve a standardized image compression mechanism, by which full-color or gray-scale images are compressed. Resolution reduction and compression in general are well-known, as suggested by U.S. Pat. No. 5,164,831 and also in U.S. Pat. No. 5,016,107 and U.S. Pat. No. 5,412,427, which are hereby incorporated by reference to the extent not inconsistent with the invention.

One of the benefits of image reduction is that less storage space is required. For example, a standard 768×512 pixel low resolution image typically would require about 1.125 mb of storage. However, when that image is compressed at a ratio of about 11.5 to 1, then only about 100 kb of storage is needed. For a compression ratio of about 12 to 1, only about 96 kb would be needed and for a compression ratio of 15 to 1, only about 76.8 kb of storage would be required. After compression at the selected ratio, the image is preferably stored on the image server, although it may alternatively be stored in any conventional storage media.

(5) Image Extraction

The method of the invention preferably includes an image extraction step. That is, a selected portion of one or more of the aforementioned images may be extracted (i.e., "cropped" or "clipped") from the image of which it forms a portion. This extraction method may also be referred to as "clipping" or "cropping" the larger image to remove the imagery surrounding the image that is extracted. For example, the vehicle image portion may be extracted from the larger traffic scene image; or the LPA image may extracted from the traffic scene image or the vehicle image; or the LPO image may be extracted from one of the other images. This extraction operation is preferably performed simultaneously with resolution reduction, i.e., in parallel. That is, a traffic scene image or vehicle image is duplicated so that one copy may be reduced in resolution and stored; and another copy may be clipped to extract a high resolution LPA or LPO image. In this manner, the portion of the traffic scene image for which high resolution is desired (typically the LPA or LPO image) is stored and processed separately from the low resolution portion. Typically, the low resolution image is the vehicle image or the entire traffic scene image. For example, an initial digitized traffic scene image having an array size of 3000×2000 pixels may be clipped so that the vehicle image and/or the image of the vehicle's license plate (e.g., the LPA image) is isolated within a smaller area having, for example, an array of 768×512 pixels. This clipping operation may be accomplished by removing selected scene information outside a pre-determined area, e.g., non-vehicle imagery, in which the license plate is normally found, e.g. the lower middle quarter of the 3000×2000 pixel image.

In a specific embodiment, the LPA image is clipped using the size and position coordinates as found during optical recognition. For example, the image may be clipped to form a 300×200 pixel image called the License Plate Only (LPO) image. This clipping further isolates the license plate image and reduces the necessary storage, for example, from 1.125 mb for the 768×512 pixel image to only 768 kb for the 300×200 pixel image. This LPO image may then be digitally compressed by JPEG standards, thus reducing the storage to 14.6 kb for a 12 to 1 compression and to 11.7 kb for a 15 to 1 compression. The compressed LPO image may then be stored, e.g., on the central server. Advantageously, the production of the LPO image from the LPA image reduces the total file size yet maintains the initial alphanumeric characters and jurisdiction information in original high resolution. Image extraction itself, including the clipping or cropping of portions of a digital image, is conventional and thus will not be described in detail.

(6) Optical Character Recognition

In another specific embodiment of the invention, the method includes one or more optical character recognition (OCR) steps. Optical character recognition (OCR) itself is conventional and thus will not be described in detail. In accordance with this invention, OCR may be used to automatically obtain the plate owner information by accessing the database containing the registered owner data set and storing the result along with a digital traffic image. More particularly, after or during the clipping and resolution reduction operations, any one of the traffic images may be passed to an optical character recognition (OCR) system to convert various traffic data from the image to a form that can be stored in the database and matched with registered owner information. Preferably, the traffic data are stored in an ASCII text string. For example, the license plate registration number and certain jurisdiction information from the LPA image may be read by OCR techniques into an ASCII text string. The OCR system preferably also locates the exact size and position coordinates of the license plate from the LPA image, e.g., within the 768×512 pixel area. In accordance with a specific embodiment of the invention, if the OCR operation is successful, then the traffic data may be processed as described below. If, however, the OCR operation is unsuccessful, e.g., the license plate number is not read for any reason, an "error" may be signaled, and the LPA image is then digitally compressed and stored, e.g., on the central server for further processing. In a specific embodiment, the traffic data are used to locate the plate owner's information in a vehicle and customer database, preferably a registered owner database, e.g., using on-line or batch mode processes. After being recognized by the OCR step, the license plate information and plate owner's information may be stored on the image server or some other storage media.

The OCR step is preferably done simultaneously with both the creation of the low resolution image resulting from resolution reduction and the creation of the LPA image resulting from the clipping or extraction step. Thus, for example, the OCR step may be performed on the initial 3000×2000 pixel digitized traffic scene image to locate and recognize traffic data, e.g., lines of text originally placed on the film by the camera. The optically recognized characters are preferably stored as an ASCII text string within the recorded image, e.g., the traffic scene image or the vehicle image. The ASCII text string on the image is then compared to reference data, e.g., camera deployment data stored on a diskette. If the ASCII text string and the diskette's camera deployment data do not match, then the system prompts for an operator to intervene to ultimately correct the data block matching or reject the image. If there is a match or the match has been corrected, the ASCII text string is stored on the image server.

(7) Image and Data Storage

The central server is responsible for storing the traffic data and images after they are generated by image processing and OCR. Each of the system components are preferably linked via a local area network (LAN) to the central server. Preferably, the central server is a UNIX-based server, although other types of servers may be used. Other data besides the traffic data may also be stored on the central server, e.g., access control information. At least three separate data sets (or individual databases) are typically linked and managed by the central server. These include the traffic data set (or database), containing the recovered traffic data; the image data set (or database), containing the processed images, and the registered owner data set (or database), containing information on registered vehicle owners, e.g., license plate number, type of vehicle and name of owner. Preferably, the three data sets are stored on a single central database, e.g., an Oracle database, located on the central server. The document scanner and notices database may also be connected to the central server. After a traffic document is prepared, the traffic images may be transferred to a magnetic storage or optical disks for archival purposes. After being prepared, the traffic document may be stored electronically and may also be printed in hardcopy or paper form. In general, devices and methods for storing data, including digitized photographic images, are well-known, as disclosed in U.S. Pat. No. 5,448,372, which is hereby incorporated by reference to the extent not inconsistent with the invention.

(8) Traffic Document Processing

Figure 2:
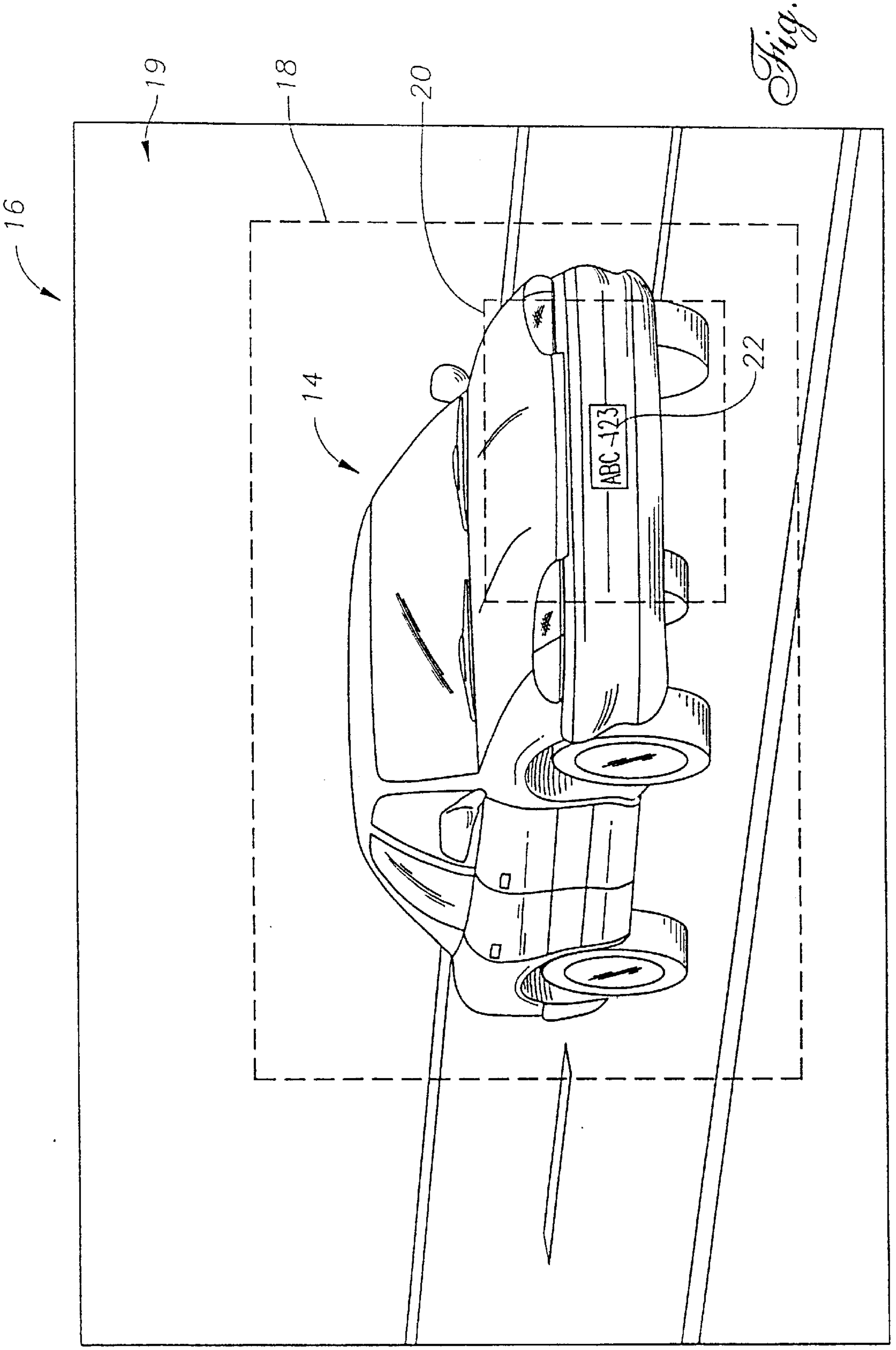
FIG. 2 is a drawing showing a traffic image, including a vehicle sub-image and a license plate area (LPA) sub-image.
Figure 3:
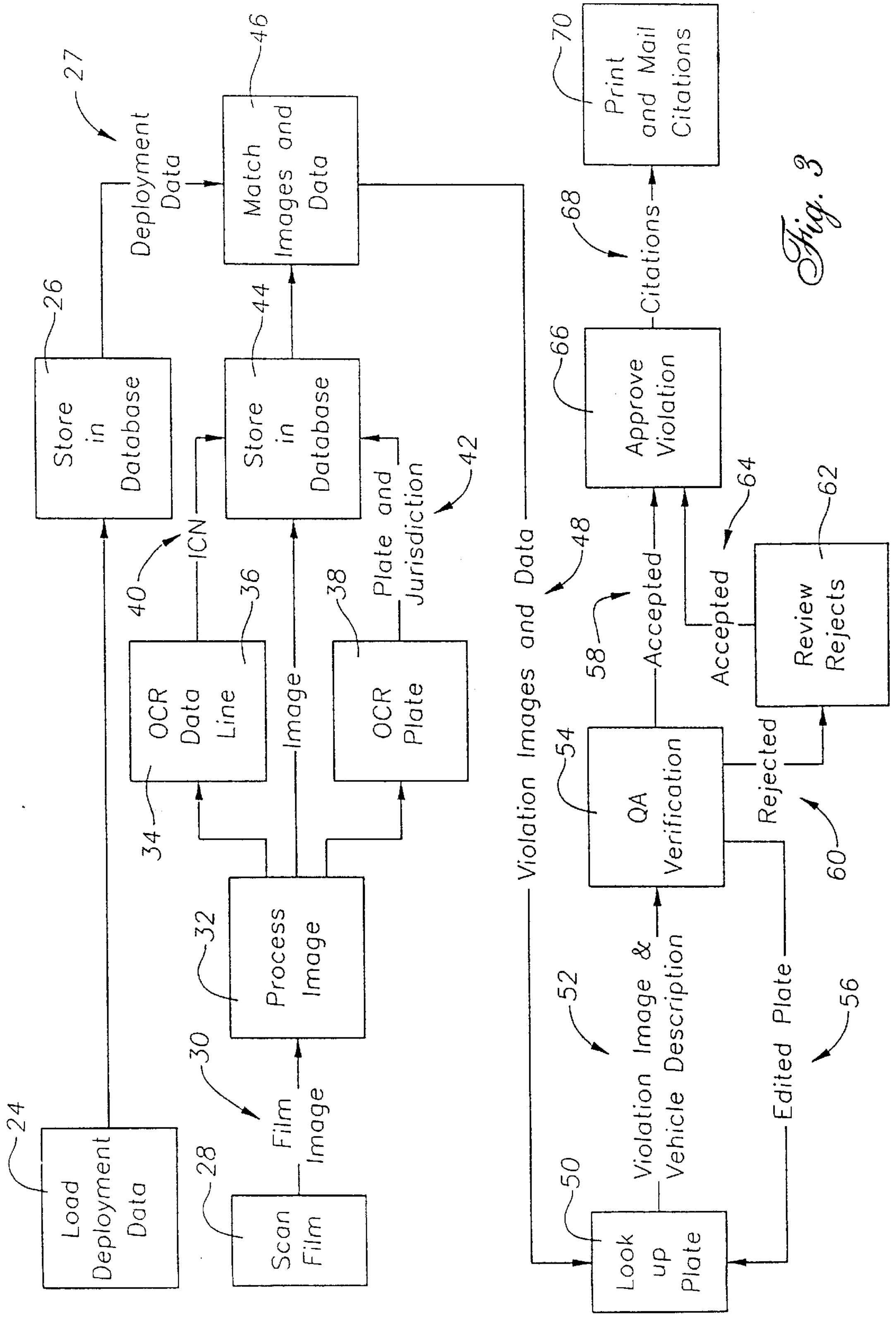
FIG. 3 is a flow diagram showing the processing of images and traffic data to provide traffic documents in accordance with a specific embodiment of the invention
Figure 4:
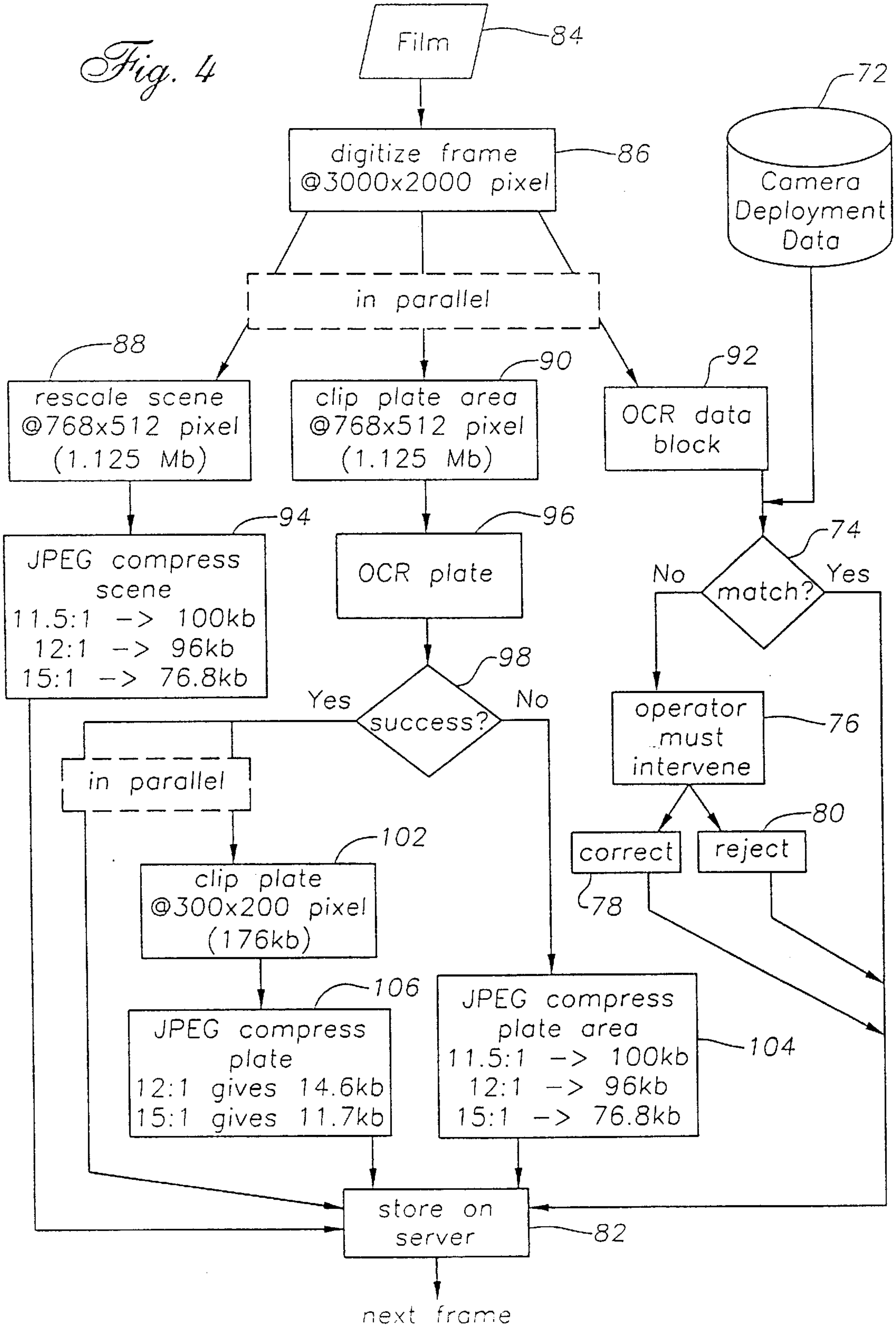
FIG. 4 is a flow diagram showing the processing of images, particularly the resolution reduction and image extraction.

A specific embodiment of an overall method for issuing traffic documents, e.g., traffic citations/tickets and evidentiary packages, using image and traffic data processing, will now be discussed in connection with FIGS. 1, 2, 3 and 4. As illustrated in FIG. 1, a vehicle 14 is monitored to determine whether it is violating a traffic regulation, in this case the speed limit. As shown in FIG. 2, a traffic image that includes the image of the vehicle 14 being monitored is captured using photographic film. Referring to FIG. 3, the film image is then scanned 28 into a digital format. The digitized film image 30 is then transferred to image processing 32, where a specific embodiment of the image processing is shown in FIG. 4.

At the image processing stage 32, the initial traffic image 16 is stored and processed to provide a smaller sub-image, in this case, the "license plate area" (LPA) image 20. As shown in FIG. 4, the film 84 may be scanned and digitized 86 to a 3000×2000 pixel image, which corresponds to image 16 in FIG. 2. The image is rescaled 88 at 768×512 pixels, which would occupy 1.125 Mb storage space. The image is compressed 94 at a selected compression ratio to further reduce storage requirements. At a compression ratio of 11.5:1, storage requirements are 100 kb; at a ratio of 12:1, storage requirements are 96 kb; while at a ratio of 15:1, only 76.5 kb of storage are required. Accordingly, the invention provides for the ability to store the image, having a reduced resolution, on from about 75 to about 100 kb of memory. After such reduction, the image is stored in the image database on the central server 82.

Simultaneously, the same traffic image 16, having the original 3000×2000 pixel resolution, is subjected to image extraction 90 by clipping, i.e., by removing the portion of the traffic image 16 outside the LPA area 20, so that LPA image occupies 768×512 pixels and 1.125 Mb. This LPA image is subjected to OCR 96, then is verified 98. If the OCR step is successful, i.e., if alphanumeric data corresponding to a license plate is successfully identified, then the registered owner database may be accessed to attempt to match the license plate from the OCR step 96 with the license plate in the registered owner information database. This matched information is then stored in the central server 82. Simulaneously, the LPA image is subjected to an extraction step 102 to provide an LPO image, i.e., the portion of the LPA image that does not include the actual license plate identified in the OCR step is removed from the LPA image, leaving a 300×200 pixel LPO image, which occupies 176 kb of memory. Using JPEG techniques, the LPO image is compressed. At a compression ratio of 12:1 the resulting LPO image occupies 14.6 kb of memory; at a ratio of 15:1, the LPO image occupies 11.7 kb of memory. The LPO image is then stored on the image database on the central server 82.

If the verification 98 step results in a conclusion that the alphanumeric data from the license plate was not successfully identified by OCR 96, then the LPA image is compressed using the same JPEG standards utilized for the LPO image, then stored separately on the image database on the central server 82.

At the same time the digitized image 16 is processed as described above, a separate OCR step 92 is used to derive the alphanumeric data from the license plate 22 appearing on the image 16. An attempt is then made to automatically match 74 the image 16 with the deployment data 72 from a diskette. If the match is successful, the matched deployment data is transferred to a traffic data database on the central server 82. If the match is unsuccessful, then an operator intervenes 76 to manually match the image 16 with the deployment data 72. If the match cannot be accomplished manually, then the image 16 is stored separately on the image database on the central server 82, where it is archived, in which case the deployment data is not used, nor is a traffic document generated. If the match can be accomplished manually, then the image 16 is stored on the image database together with the matched deployment data, then processed in the same way the automatically matched is processed.

As part of the comparison or matching step, one or more of the stored images should be decompressed from the previously compressed image(s), e.g., those which had previously been subjected to resolution reduction. The low resolution image (e.g., the traffic scene image) and the high resolution image (e.g., the LPO image) are both presented on a high resolution color display screen along with traffic data (such as deployment data, the plate owner information, the vehicle information and the license plate registration and jurisdiction information). The operator then compares the images with the textual information to determine separately if the offense data, the vehicle data, and the owner data match. Each of these matchings is preferably done in separate routines. For example, if the data sets do not match then the operator either corrects the information presented, or rejects the offense record. If the operator rejects the offense record, then the operator records the reason for the rejection. One such rejection ends the entire matching routine and the operator begins processing the next record, which includes the digital image and various textual information. If the information is a correct match, then the operator determines whether the next data set matches. This program is continued until the routine has been successfully performed on all three data sets resulting in matches or until any one data set has been rejected.

A notification procedure is also preferably included. For example, if all three data sets are correctly matched, then the operator proceeds to the notification stage. The notification process may be similar to the matching process described above. The low resolution image, the offense data, vehicle data and owner data are displayed one at a time to the operator and the operator determines if the data matches. If some data sets are not matched, the offense record is rejected and a reason is recorded. No notification is issued and the next record is processed. If all the data are verified or matched, the operator has a final opportunity for rejecting the image for any other reason. If the operator does so choose to reject, he records the reasons upon rejection. Once again no notification is issued and the operator begins processing the next record. However, if there is no rejection, a unique identifier is assigned to the record. An offense notice is generated including the LPA image, the LPO image, the offense data, the vehicle data and the owner data. The notice is either printed as a hard copy or as an electronic form onto a magnetic tape or floppy disk. The operator then creates an audit journal of the operator's actions. Periodically, the system automatically browses the data base to find notices that are unpaid 30 days after issuance. The found notices are flagged as violation tickets. Data from the data base, i.e., offense, vehicle, and owner data, the LRS image of the offense, and the LPO image are then merged into a new document to be issued as a violation ticket. This document is forwarded to the violator. A copy is also written to a disk and the database is updated. After the creation of the violation ticket, a court package is also produced. The court package includes the original film image, the scanned digital images, paper and digitized documents, and the offense, vehicle, and owner data. This information is incorporated as a single document with audited indexes to physical materials in storage.

Work flows among the various subsystems are managed by a queue manager, which allows the system to be customized in a highly flexible manner. Images and traffic data relating to a violation are preferably viewed by human verifiers who ensure that all automatically generated data are consistent and that the images are of sufficient quality to issue a citation. Any violation information that requires correction is processed manually by the verification operators or others. An external system interface is provided, where license plate and jurisdiction information are used to extract registered owner information from an external registered owner database. External systems provide information regarding the state of a violation (e.g., "ticket issued" or "fine paid"). A wide variety of interface methods may be supported and specific transaction models may be customized as desired.

A document management system is also preferably provided, e.g., a system for creating printed documents, such as violation citations (or tickets) and evidentiary packages, for submission to the printing system. The document management system may be utilized to scan and store printed materials relating to a violation, such as traffic documents. A printer, e.g., a high speed laser printer, may also be connected to the Autoscan database, to generate the traffic documents." A bar-code material tracking system may be integrated with the Autoscan database to provide a complete chain of evidence.

What is claimed is:

1. A traffic violation processing method, comprising the steps of:

monitoring a vehicle;

determining whether the vehicle is in violation of a traffic regulation;

recording a first digital traffic image comprising the image of the vehicle and data corresponding to the traffic violation;

comprising the first digital traffic image to reduce the resolution of the first digital traffic image and provide a low resolution traffic image;

storing the low resolution traffic image in a storage media;

providing a second digital traffic image which is a separate sub-image of the first digital traffic image, having an area smaller than the area of the first digital traffic image and including the license plate having alphanumeric traffic data;

providing a third digital traffic image, which is a separate sub-image of the second digital traffic image, having an area smaller than the area of the second digital traffic image and including the license plate having alphanumeric traffic data;

reading the alphanumeric traffic data from the second or third digital traffic image;

storing the alphanumeric traffic data in the storage media in the form of an ASCII text string;

comparing the stored alphanumeric traffic data from the second digital traffic image with registered vehicle owner information stored in a database to identify the registered owner of the vehicle; and generating a comprehensive traffic violation document that integrates the first digital traffic image, the name of the registered owner and the alphanumeric traffic data so that the document can be issued to the owner of the vehicle.

* * * * *